(12) United States Patent
Lu et al.

(10) Patent No.: US 9,703,605 B2
(45) Date of Patent: Jul. 11, 2017

(54) FINE-GRAINED HETEROGENEOUS COMPUTING

(71) Applicant: MediaTek Inc., Hsinchu (TW)

(72) Inventors: Chien-Ping Lu, Cupertino, CA (US); Hsilin Huang, Cupertino, CA (US)

(73) Assignee: MediaTek, Inc., Hsinchu (TW)

( * ) Notice: Subject to any disclaimer, the term of this patent is extended or adjusted under 35 U.S.C. 154(b) by 17 days.

(21) Appl. No.: 14/845,647

(22) Filed: Sep. 4, 2015

(65) Prior Publication Data

US 2017/0068571 A1 Mar. 9, 2017

(51) Int. Cl.
 G06F 9/48 (2006.01)
 G06F 9/50 (2006.01)
 G06F 9/38 (2006.01)

(52) U.S. Cl.
 CPC .......... G06F 9/5016 (2013.01); G06F 9/3836 (2013.01); G06F 9/4881 (2013.01)

(58) Field of Classification Search
 None
 See application file for complete search history.

(56) References Cited

U.S. PATENT DOCUMENTS 7,769,792 B1 * 8/2010 Burrows ........... G06F 17/30306 707/638
8,621,184 B1 * 12/2013 Radhakrishnan ..... G06F 9/4881 712/220
2005/0273770 A1 * 12/2005 Eichenberger ........ G06F 8/4452 717/136
2007/0005869 A1 * 1/2007 Balraj .................. G06F 9/4401 711/2
2009/0158282 A1 * 6/2009 Blaisdell ............... H04L 45/745 718/102
2014/0317336 A1 * 10/2014 Fitch ................... G06F 12/0246 711/103
2015/0269065 A1 * 9/2015 Bourd ...................... G06F 9/54 711/155
2016/0241435 A1 * 8/2016 Iordache ............. H04L 41/0823

* cited by examiner

*Primary Examiner* — Emerson Puente
*Assistant Examiner* — Jonathan R Labud
(74) *Attorney, Agent, or Firm* — The Law Office of Tong Lee

(57) ABSTRACT

A heterogeneous computing system described herein has an energy-efficient architecture that exploits producer-consumer locality, task parallelism and data parallelism. The heterogeneous computing system includes a task frontend that dispatches tasks and updated tasks from queues for execution based on properties associated with the queues, and execution units that include a first subset acting as producers to execute the tasks and generate the updated tasks, and a second subset acting as consumers to execute the updated tasks. The execution units includes one or more control processors to perform control operations, vector processors to perform vector operations, and accelerators to perform multimedia signal processing operations. The heterogeneous computing system also includes a memory backend containing the queues to store the tasks and the updated tasks for execution by the execution units.

20 Claims, 6 Drawing Sheets

FINE-GRAINED HETEROGENEOUS COMPUTING

TECHNICAL FIELD

Embodiments of the invention relate to heterogeneous computing; and more specifically, to an energy-efficient heterogeneous computing architecture.

BACKGROUND

According to Dennard scaling, voltage and current should be proportional to the linear dimensions of a transistor, and power consumption (the product of voltage and current) should be proportional to the area of a transistor. As the sizes of transistors continue to shrink, the number of transistors that can fit into the same area of a chip has grown exponentially. Thus, it has been predicted that the computing performance per watt can also grow exponentially. However, Dennard scaling appears to have broken down in the last decade. Even though the size of transistors continues to shrink, the per watt computing performance has not improved at the same rate. There are various reasons for the breakdown of Dennard scaling. One of the reasons is that at small sizes current leakage can cause a chip to heat up which increases energy costs and the risk of thermal runaway. To prevent thermal runaway, a portion of the silicon on the chip cannot be powered-on at the nominal operating voltage for a given thermal design power (TDP) constraint. This phenomenon, referred to as "dark silicon," significantly constraints the per watt computing performance in modern processors.

The breakdown of Dennard scaling has prompted some chip manufacturers to resort to multicore processor designs. However, even multicore processors have encountered the same "dark silicon" problem. Depending on the processor architecture, cooling technology, and application workloads, the amount of dark silicon may exceed 50%. Thus, there is a need to improve energy and computing efficiency in modern computer systems.

SUMMARY

In one embodiment, a heterogeneous computing system is provided. The heterogeneous computing system includes a task frontend that dispatches tasks and updated tasks from queues for execution based on properties associated with the queues, and execution units that include a first subset acting as producers to execute the tasks and generate the updated tasks, and a second subset acting as consumers to execute the updated tasks. The execution units includes one or more control processors to perform control operations, vector processors to perform vector operations, and accelerators to perform multimedia signal processing operations. The heterogeneous computing system also includes a memory backend containing the queues to store the tasks and the updated tasks for execution by the execution units.

In another embodiment, a method is provided to be performed by a heterogeneous computing system that includes a plurality of execution units. The method comprises dispatching, by a task frontend, tasks and updated tasks from a plurality of queues for execution based on properties associated with the queues; executing the dispatched tasks to generate the updated tasks by a first subset of the execution units acting as producers; and executing the dispatched updated tasks by a second subset of the execution units acting as consumers. The execution units include one or more control processors to perform control operations, vector processors to perform vector operations, and accelerators to perform multimedia signal processing operations.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
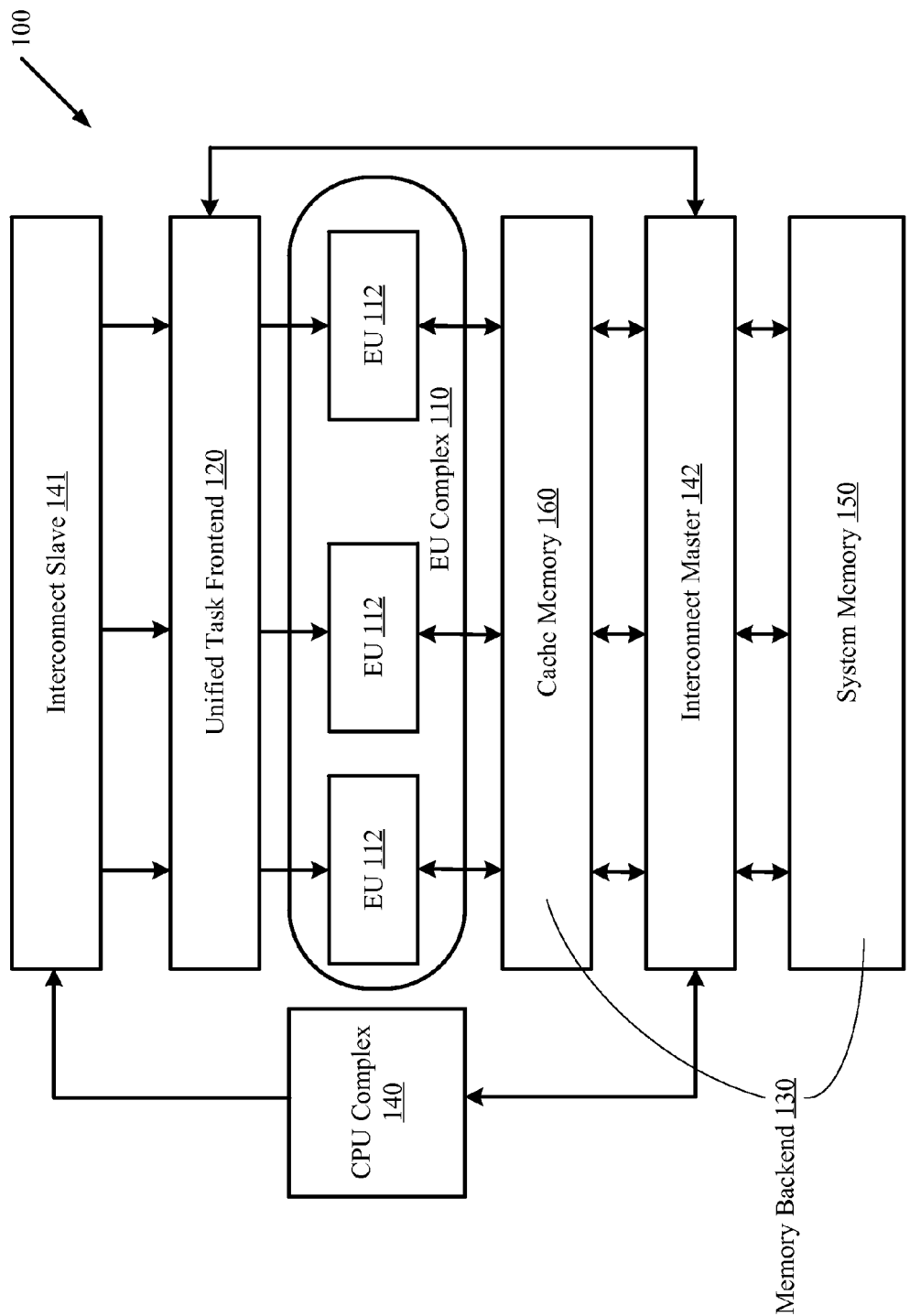
FIG. 1 illustrates an architecture for a heterogeneous computing system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A heterogeneous computing system includes more than one type of processing engines working in tandem to perform computing tasks. For example, a heterogeneous computing system may include processing engines such as one or more central processing units (CPUs), one or more graphics processing units (GPUs), one or more digital signal processors (DSPs), etc. In some embodiments, the processing engines may all be integrated into a system-on-a-chip (SoC) platform. The processing engines communicate with each other and the system memory through an interconnect; on an SoC platform such an interconnect may be referred to as an SoC fabric.

As an example, a heterogeneous computing system may include a combination of CPUs, GPUs and DSPs. The CPU performs general-purpose computing tasks, and the DSP performs a combination of signal, image and multimedia processing tasks. The GPU performs graphics processing tasks; e.g., creating 2D raster representations of 3D scenes.

These graphics processing tasks are referred to as 3D graphics pipelining or rendering pipelining. The 3D graphics pipelining may be implemented by a combination of fixed-function hardware tailored for speeding up the computation, and general-purpose programmable hardware to allow flexibility in graphics rendering. The general-purpose programmable hardware is also referred to as shader hardware. In addition to rendering graphics, the shader hardware can also perform general computing tasks.

According to one embodiment of a heterogeneous computing system, the CPUs assign tasks to the execution units (EUs) of GPUs and DSPs via a unified task frontend and a memory backend. An EU is a general-purpose or special-purpose processor that executes a specific function of a GPU or a DSP. The set of EUs (also referred to as an EU complex) as a whole executes the GPU and DSP functions, and share the unified frontend and the memory backend. The heterogeneous computing system has a fine-grained architecture in that each EU performs a function on a unit of task (also referred to as a packet) before passing it on to the next consumer of the packet. As will be described in further detail below, the fine-grained architecture minimizes system memory traffic and is energy-efficient. In one embodiment, the heterogeneous computing system may include three types of execution units (EUs): a control processor for sequencing and branch control, a vector processor for data-parallel workload, and a set of accelerators for specific fixed-function workload.

The heterogeneous computing system described herein has improved energy efficiency due to an architectural design that leverages task parallelism, data parallelism and producer-consumer locality. Task parallelism refers to the processing of different tasks, such as processes and threads, by different EUs or different processor cores of the same EU. Data parallelism refers to the processing of data vectors by vector processors. In one embodiment, each of the vector processors is an EU. Producer-consumer locality refers to the streaming of the intermediate output of a producer EU to a consumer EU via a local path, such as through a cache memory (e.g., a level-2 (L2) cache), to minimize system memory traffic and save energy. The CPU does not intervene in the data transfer between the producer EU and the consumer EU; instead the data transfer is handled by self-enqueue and cross-enqueue mechanisms. Each EU may be a producer EU, a consumer EU, or both. When the producer EU and the consumer EU are the same EU, the producer-consume locality may be handled by self-enqueue; when the producer EU and the consumer EU are different EUs, the producer-consume locality may be handled by cross-enqueue. In one embodiment, both the self-enqueue and the cross-enqueue may be managed by a unified task frontend, which dispatches and synchronizes task assignments among the EUs without the CPU intervention. Thus, the CPU may "fire and forget" the task assignments—that is, the CPU writes the initial task assignments to the memory backend, and the unified task frontend takes over the subsequent task dispatch and synchronization.

FIG. 1 illustrates an example architecture for a heterogeneous computing system 100 according to one embodiment. The system 100 includes an EU complex 110, which further includes a plurality of EUs 112, connected to a unified task frontend 120 (also referred to as a task frontend) and a memory backend 130. The memory backend 130 includes a cache memory 160 (e.g., an L2 cache or other levels of cache memory) shared by the EUs 112, and a system memory 150 (e.g., a dynamic random-access memory (DRAM) or other volatile or non-volatile random-access memory). A CPU complex 140, which includes one or more CPU processor cores, is connected to the task frontend 120 via an interconnect slave 141 (e.g., an SoC fabric slave). The CPU complex 140 is also connected to the memory backend 130 via an interconnect master 142 (e.g., an SoC fabric master). The interconnect master 142 serves the role of a master by pushing data to a destination, while the interconnect slave 141 serves the role of a slave by receiving data. Although the interconnect slave 141 and the interconnect master 142 are shown as two separate blocks, in some embodiments both the slave 141 and the master 142 are part of the same interconnect hardware.

In one embodiment, each EU 112 in the EU complex 110 is operative to receive a unit of tasks (also referred to as a packet) from the task frontend 120, execute the packet, and output an updated packet to the memory backend 130. The updated packets are also referred to as updated tasks. The updated tasks may be sent to the task frontend 120, which in turn launches the updated tasks to the appropriate consumer EUs in the EU complex 110. The consumer EUs perform further updates to the updated tasks, and the execution cycle from the memory backend 130 via the task frontend 120 to the EUs 112 and back to the memory backend 130 continues until all of the tasks are completed.

In one embodiment, the heterogeneous computing system 100 may be part of a mobile computing and/or communication device (e.g., a smartphone, a tablet, a laptop, a gaming device, etc.). In one embodiment, the heterogeneous computing system 100 may be part of a desktop computing system, a server computing system, or a cloud computing system.

Figure 2:
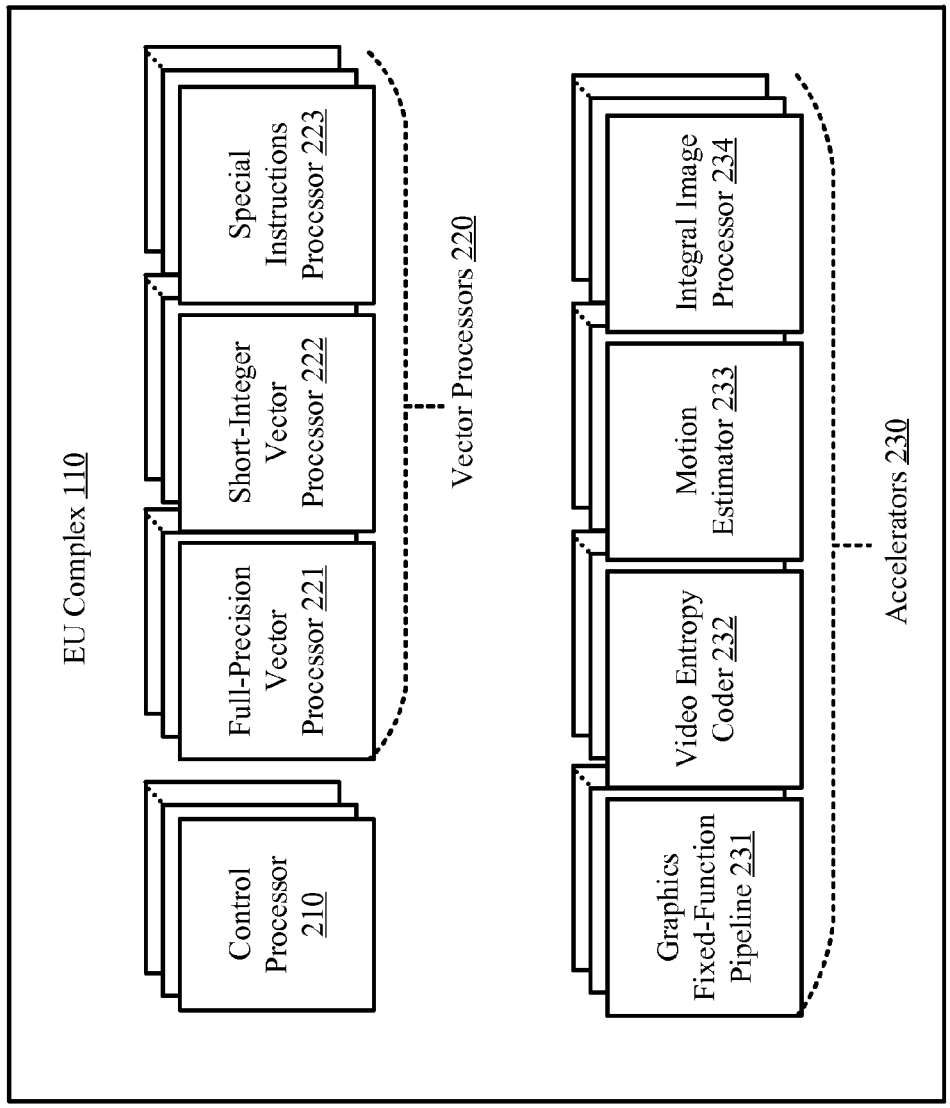
FIG. 2 illustrates an execution unit complex in a heterogeneous computing system according to one embodiment.

FIG. 2 illustrates an example of the EU complex 110 according to one embodiment. In this example, the EU complex 110 includes a plurality of EUs having the functionalities of GPUs and DSPs. Examples of the EUs include, but are not limited to: one or more control processors 210 to perform control operations, vector processors 220 to perform vector operations, and accelerators 230 to perform multimedia signal processing operations. Examples of the control operations include, but are not limited to, if-then operations, while loop, etc. Examples of the vector processors 220 include, but are not limited to: full-precision vector processors 221, short integer vector processors 222 and special instructions processors 223. The short integer vector processors 222 may include vector processors optimized for different short integer types, and the special instructions processors 223 are special-purpose processors that perform operations including, but not limited to, sine, cosine, log, and other mathematical operations. Examples of the accelerators 230 include, but are not limited to: graphics fixed-function pipelines 231, video entropy coders 232, motion estimators 233, digital signal processors and image processors such as an integral image processor 234. The accelerators 230 may include special-purpose hardware optimized for graphics pipeline processing. Although the example of FIG. 2 illustrates multiple instances of each EU type (e.g., EU 210, 221, 222, 223, 231, 232, 233 or 234), it is understood that each EU type may include any number of instances.

In one embodiment, the vector processors 220 provide the functionalities of a shader in a GPU, with support for additional data types (e.g., multiple short-integer types). The accelerators 230 provide the functionalities of a fixed-function pipeline in a GPU, with support for additional signal and image processing. Integrating the signal and image processing capabilities into the EU complex 110 increases energy efficiency of the system 100, because more types of EUs can participate in task parallelism, data parallelism and producer-consumer locality.

Figure 3:
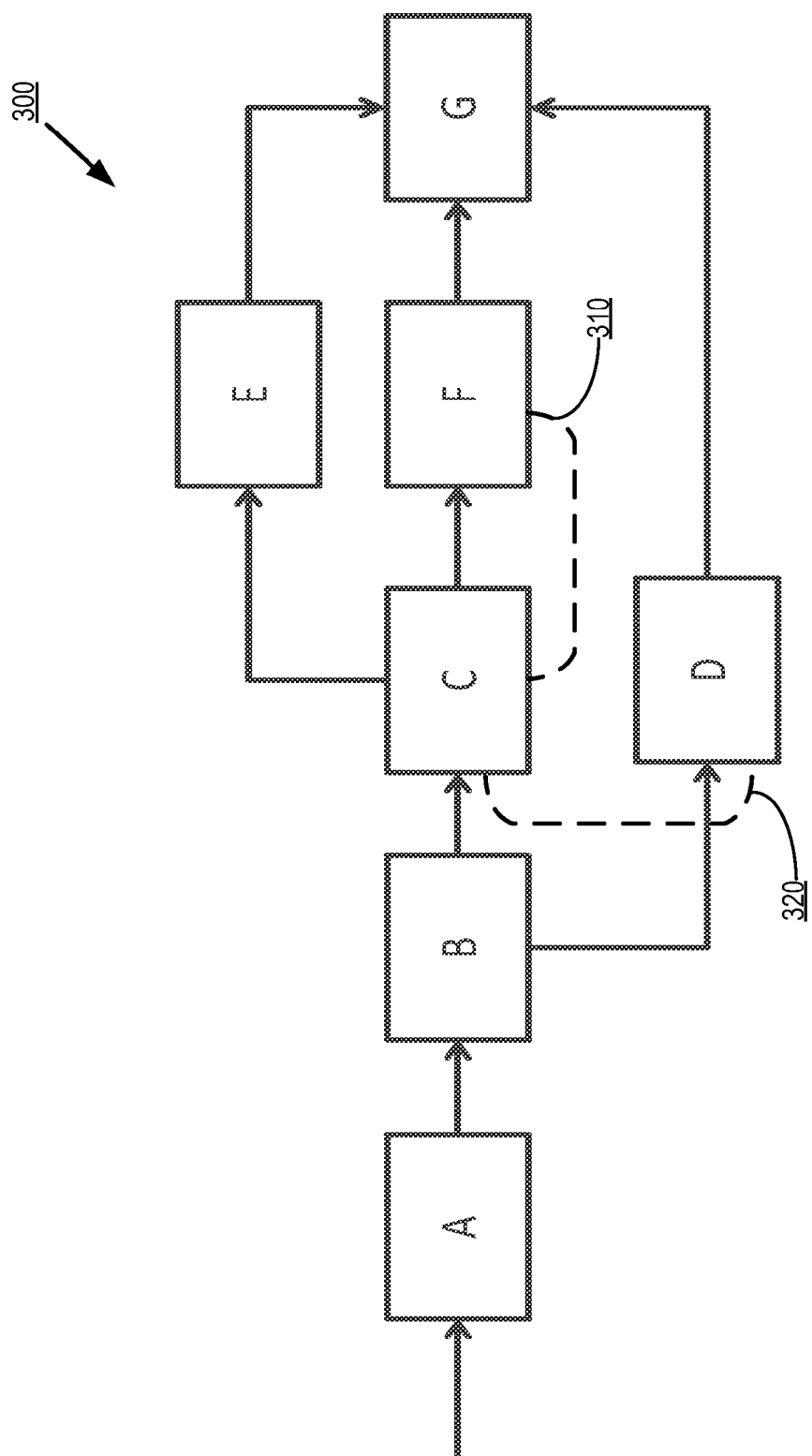
FIG. 3 illustrates an example of a task graph according to one embodiment.

FIG. 3 is an example of a task graph 300 according to one embodiment. The task graph 300 is a representation of the dependency among the tasks to be run in a computing system, such as the heterogeneous computing system 100 of FIG. 1. In this example, each block represents a task, and each directed line between the blocks represents dependency. Two or more tasks may be assigned to the same EU or different EUs; e.g., two or more video encoding tasks may be assigned to the same video encoding accelerator or different video encoding accelerators. The task graph 300 helps identify task parallelism, data parallelism and producer-consumer locality. For example, producer-consumer locality may exist in block C and block F, the relationship of which is shown by a dotted line 310. Task parallelism may exist in block C and block D, the relationship of which is shown by a dotted line 320. Data parallelism may be exist within any of the blocks A-G where vector computations take place.

In one embodiment, the CPU complex 140 of the system 100 may generate a task graph for the tasks to be executed by the EUs. Based on the task graph, the CPU complex 140 determines how many queues to generate and how to map the queues to the EUs. In one embodiment, the CPU complex 140 acts as a host producer by writing the tasks into the queues in the form of task data structures (e.g., packets). In one embodiment, a packet including, but not limited to, the dimension of the task, a pointer pointing to an argument buffer, and a program (instructions) pointer pointing to program code of the task. The CPU complex 140 also takes care of the dependency among the tasks by embedding the dependency information in the packets and the queues. In one embodiment, a packet may contain the identifier of a destination queue such that after a producer EU executes the packet, the producer EU can write the updated packet into the destination queue for a consumer EU.

Figure 4:
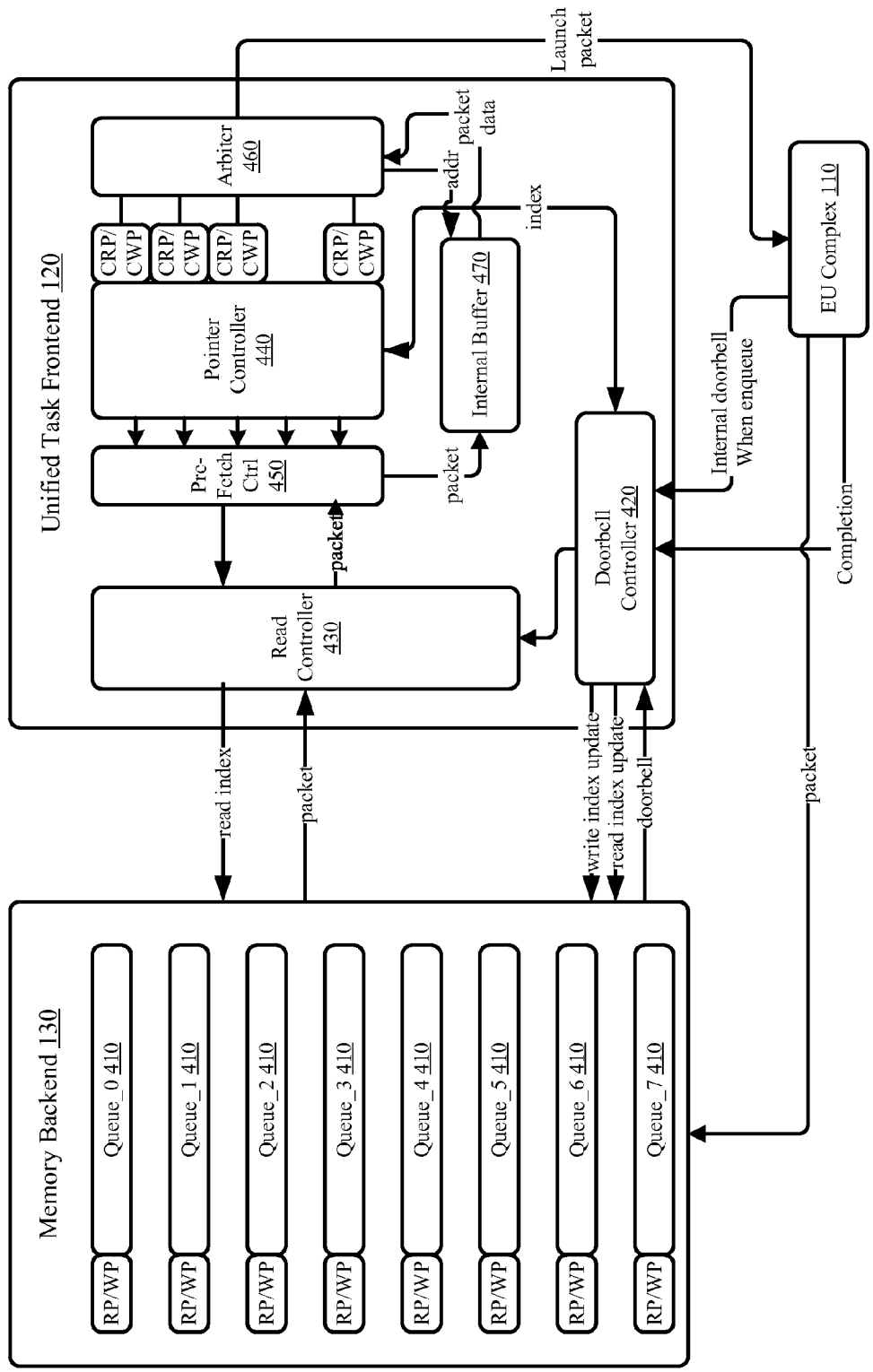
FIG. 4 illustrates a unified task frontend and a memory backend in a heterogeneous computing system according to one embodiment.

FIG. 4 illustrates further details of the task frontend 120 interacting with the EU complex 110 and the memory backend 130 according to one embodiment. Referring also to FIG. 1, in one embodiment, the memory backend 130 includes a plurality of queues 410. Queue data is stored in the cache memory 160, and may be moved to the system memory 150 according to a cache replacement policy. Each queue 410 has a read pointer (RP) and a write pointer (WP) associated with it to indicate the current read and write positions. Although eight queues are shown, it is understood that the memory backend 130 may include any number of queues.

In one embodiment, the EUs in the EU complex 110 receive packets from the queues 410, and writes execution results (i.e., updated packets) back to the queues 410. Each queue is designated to only one consumer EU, and multiple queues may be designated to the same consumer. A producer EU may write its execution results to any of the queues. In operation, a producer EU will write its execution results to one or more queues designated for the consumers of the execution results. Producer-consumer locality is exploited by self-enqueue and cross-enqueue: an EU may self-enqueue by writing its execution results into its own queue(s), and two or more EUs may cross-enqueue when one EU writes its execution results to the queue(s) designated to another EU.

In one embodiment, the CPU complex 140 generates a task graph (an example of which is shown in FIG. 3) describing the tasks to be performed. Based on the task graph, the CPU complex 140 determines the number of queues to set up, and the mapping between the queues and the EUs. The CPU complex 140 then informs the task frontend 120 of the locations of the queues in the memory backend 130, as well as the mapping between the queues and the EUs. Then the CPU complex 140 writes tasks to the queues 410. Since the CPU complex 140 does not have direct access to the cache memory 160, the CPU complex 140 may write to the system memory 150 via the interconnect master 142, at memory locations corresponding to the appropriate queues that are mapped to the appropriate EUs.

After the CPU complex 140 finishes writing the tasks, it sends a doorbell signal with a write index update signal to a doorbell controller 420 in the task frontend 120. The terms "index" and "pointer" are herein used interchangeably. The doorbell controller 420 keeps track of the read and write pointers of each queue 410. When a producer EU completes a write to a queue 410, it also sends a doorbell signal (shown in FIG. 4 as an internal doorbell) to the doorbell controller 420. In one embodiment, the doorbell controller 420 updates the write index when a queue is written to; alternatively, the producer EUs may directly update the write index. In one embodiment, a producer (e.g., an EU or a CPU) may write the doorbell signal into a memory-mapped I/O (MMIO) register associated with a queue being written. The write action can trigger a signal (shown in FIG. 4 as an MMIO doorbell) to be sent to the doorbell controller 420.

When a consumer EU finishes execution of a packet, it sends a completion signal to the doorbell controller 420. The doorbell controller 420 then updates the read index for the queue from which the packet was read. When the read index is equal to the write index of a queue, it indicates that there is no packet in the queue waiting to be executed. The consumer EU for the queue may be waiting for the execution result from another EU, or may have finished all its tasks. When the read index is equal to the write index for every queue, it indicates that execution of the tasks by the EUs has ended.

In one embodiment, the task frontend 120 further includes a read controller 430, a pointer controller 440 and a pre-fetch controller 450 to manage read operations from the queues 410. The pointer controller 440 maintains a list of local read and write pointers (shown as CRP/CWP) for each queue 410, according to the indexes sent from the doorbell controller 420. In one embodiment, the pointer controller 440 directs the pre-fetch controller 450, which in turn directs the read controller 430 to pre-fetch packets from the queues 410 to an internal buffer 470 (e.g., a static RAM (SRAM)) for temporary storage. The read controller 430, according to the read index sent from the pre-fetch controller 450, reads a packet from one of the queues 410 at the position pointed to by the read index. In one embodiment, the pre-fetch may be performed on the queues 410 in round-robin or according to a predetermined schedule.

The task frontend 120 further includes an arbiter 460. The arbiter 460 determines which packet (among the ones in the internal buffer 470) gets launched into an EU, and retrieves that packet from the internal buffer 470 using the packet's address. The determination may be made according to round-robin, the amount of time a packet has spent in the internal buffer 470, or a predetermined schedule. After the EU receives the packet, it executes the required operations and writes the output (i.e., the updated packet) to the queue designated to the next consumer of the packet. The EU may update the write index of the queue or signal the doorbell controller 420 to update the write index.

It is noted in the embodiment of FIG. 4, the CPU writes the tasks into the queues only at the beginning of the task execution. The task execution fully exploits producer-consumer locality among the EUs without the CPU intervention. Multiple EUs may execute their respective tasks in parallel to exploit task parallelism. Furthermore, data parallelism may be exploited by assigning vector computing tasks to the EUs that have vector processors.

Figure 5:
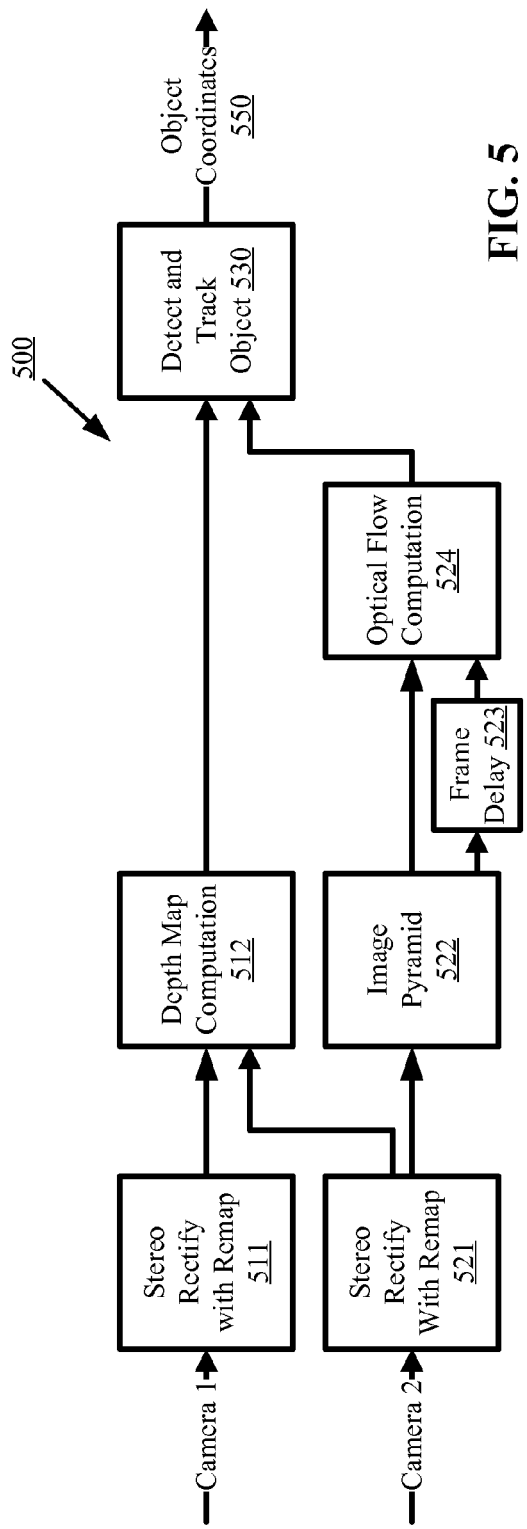
FIG. 5 illustrates an example of a task graph for stereo vision processing according to one embodiment.

FIG. 5 illustrates an example of a task graph 500 for stereo vision processing according to one embodiment. The stereo vision processing may be performed by the system 100 of FIG. 1. The stereo vision processing uses the images produced by two cameras at two different angles to produce 3D images. The task graph 500 includes stereo rectify with remap blocks 511 and 521, which receive calibration information from respective cameras as input, and adjust the output images of the cameras to align the images. The task graph 500 further includes a depth map computation block 512, which produce 3D depth information from the aligned images.

The task graph 500 further includes an image pyramid block 522, which produces images of a hierarchy of different scales. The output from the image pyramid block 522 is fed into a frame delay 523 to generate delayed frames, as well as an optical flow computation block 524. The optical flow computation block 524 compares a previous frame (i.e., a delayed frame) with a current frame to produce an optical flow for features and angles of each graphical object, and to determine for each graphical object its movement, size and edges. The optical flow from the optical flow computation block 524 is combined with the 3D depth from the depth map computation block 512 to produce object coordinates 550 for object tracking.

Figure 6:
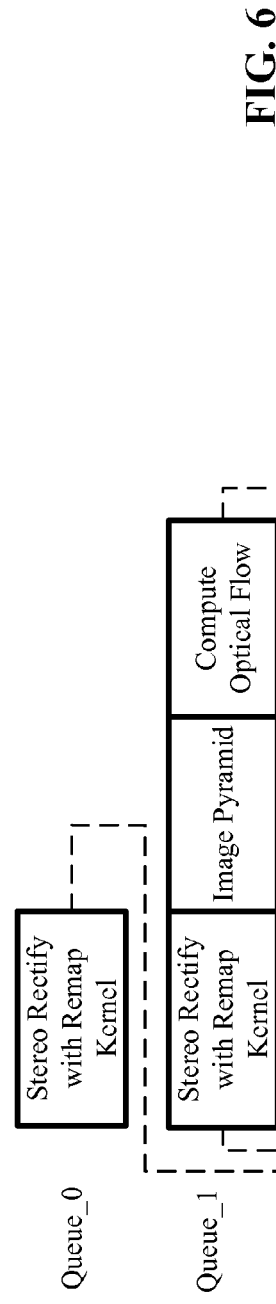
FIG. 6 illustrates the allocation of tasks to queues in the stereo vision example of FIG. 5 according to one embodiment.

FIG. 6 illustrates one example of an arrangement of queues for processing the task graph 500 of FIG. 5 according to one embodiment. This example uses three queues having dependency (shown as dotted lines) among them. A dependent task waits until its parent task(s) is finished. In this example, the three queues can be assigned to three different EUs (as consumer EUs) operating in parallel. For example, each of Queue_0 and Queue_1 may be assigned to an accelerator (e.g., one of the accelerators 230 of FIG. 2) or a shader (e.g., one of the vector processors 220 of FIG. 2), and Queue_2 may be assigned to a shader. In one embodiment, the three EUs may be connected to the unified task frontend 120 and the memory backend 130 as shown in FIG. 4 to exploit producer-consumer locality, task parallelism and data parallelism.

Figure 7:
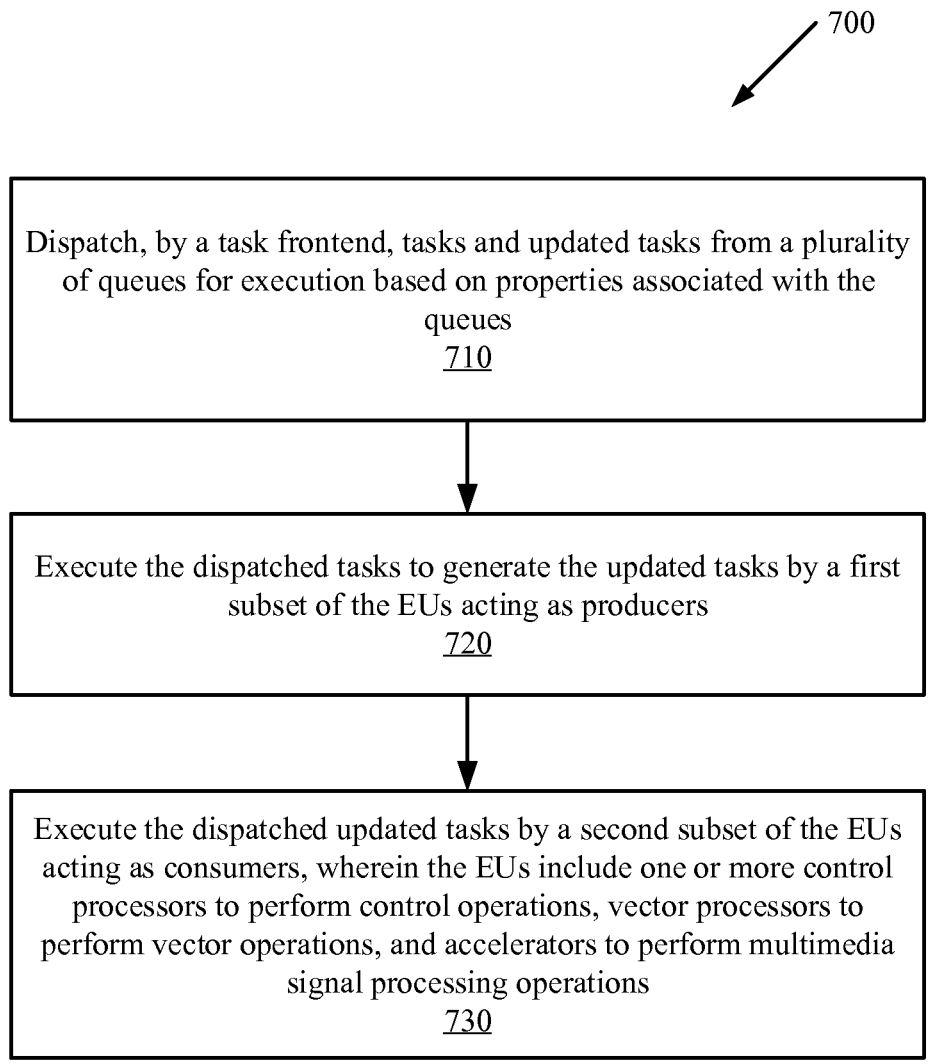
FIG. 7 is a flow diagram illustrating a method performed by a heterogeneous computing system according to one embodiment.

FIG. 7 is a flow diagram illustrating a method 700 performed by a heterogeneous computing system that includes a plurality of EUs, such as the system 100 of FIG. 1, according to one embodiment. Referring to FIG. 7, the method 700 begins with dispatching, by a task frontend, tasks and updated tasks from a plurality of queues for execution based on properties associated with the queues (block 710). The method 700 further comprises executing the dispatched tasks to generate the updated tasks by a first subset of the EUs acting as producers (block 720). The method further comprises executing the dispatched updated tasks by a second subset of the EUs acting as consumers. The EUs include one or more control processors to perform control operations, vector processors to perform vector operations, and accelerators to perform multimedia signal processing operations (block 730).

The operations of the flow diagram of FIG. 7 have been described with reference to the exemplary embodiments of FIGS. 1, 2 and 4. However, it should be understood that the operations of the flow diagram of FIG. 7 can be performed by embodiments of the invention other than those discussed with reference to FIGS. 1, 2 and 4, and the embodiments discussed with reference to FIGS. 1, 2 and 4 can perform operations different than those discussed with reference to the flow diagram. While the flow diagram of FIG. 7 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A heterogeneous computing system comprising:
   one or more central processing units (CPUs) to determine, based on dependency among tasks, how many queues to generate and a mapping of the queues to a plurality of execution units;
   a task frontend to receive an initial assignment of the tasks from the one or more CPUs, to dispatch the tasks and updated tasks from the queues for execution based on the mapping of the queues, and to manage, without intervention from the one or more CPUs, self-enqueue in which a consumer of a first task is same as a producer of the first task, and cross-enqueue in which a consumer of a second task is different from a producer of the second task;
   the plurality of execution units that include a first subset acting as producers to execute the tasks and generate the updated tasks, and a second subset acting as consumers to execute the updated tasks, wherein different execution units of the second subset receive the updated tasks via the task frontend from different queues, and wherein the execution units include one or more control processors to perform control operations, vector processors to perform vector operations, and accelerators to perform multimedia signal processing operations; and
   a memory backend containing the queues to store the tasks and the updated tasks for execution by the execution units.

2. The system of claim 1, wherein the accelerators include one or more of the following: a graphics fixed-function pipeline, a video entropy coder, a motion estimator, a digital signal processor and an integral image processor.

3. The system of claim 1, wherein the vector processors include one or more of the following: a full-precision vector processor, a short integer vector processor and a special instructions vector processor.

4. The system of claim 1, wherein the one or more CPUs are operative to create the tasks, the queues and properties associated with the queues.

5. The system of claim 4, wherein the properties associated with the queues include a designated consumer for each of the queues.

6. The system of claim 1, wherein the memory backend further comprises:
   a cache memory shared by the execution units to store at least a portion of the queues.

7. The system of claim 1, wherein the task frontend further comprises:
   a doorbell controller to receive a doorbell signal when a task is written to one of the queues, and to receive a completion signal when one of the execution units reads the task and completes execution of the task.

8. The system of claim 1, wherein each queue is associated with a read index and a write index, and wherein the write index is stored in a memory-mapped I/O (MMIO) register to indicate a write location in the queue.

9. The system of claim 1, wherein the task frontend further comprises:
controller circuitry to fetch a task from the queues, store the task in an internal buffer memory, and dispatch the task to the execution units for execution.

10. The system of claim 1, wherein the tasks are represented by one or more task data structures pointing to program code of the tasks.

11. A method performed by a heterogeneous computing system including a plurality of execution units, comprising:
determining, by one or more central processing units (CPUs) based on dependency among tasks, how many queues in a memory backend to generate and a mapping of the queues to a plurality of execution units;
receiving, by a task frontend, an initial assignment of the tasks from the one or more CPUs;
dispatching, by the task frontend, the tasks and updated tasks from the queues for execution based on the mapping of the queues;
managing, by the task frontend without intervention from the one or more CPUs, self-enqueue in which a consumer of a first task is same as a producer of the first task, and cross-enqueue in which a consumer of a second task is different from a producer of the second task;
executing the dispatched tasks to generate the updated tasks by a first subset of the execution units acting as producers; and
executing the dispatched updated tasks by a second subset of the execution units acting as consumers, wherein different execution units of the second subset receive the updated tasks via the task frontend from different queues, and wherein the execution units include one or more control processors to perform control operations, vector processors to perform vector operations, and accelerators to perform multimedia signal processing operations.

12. The method of claim 11, wherein the accelerators include one or more of the following: a graphics fixed-function pipeline, a video entropy coder, a motion estimator, a digital signal processor and an integral image processor.

13. The method of claim 11, wherein the vector processors include one or more of the following: a full-precision vector processor, a short integer vector processor and a special instructions vector processor.

14. The method of claim 11, further comprising:
creating, by the one or more CPUs, the tasks, the queues and properties associated with the queues.

15. The method of claim 14, wherein the properties associated with the queues include a designated consumer for each of the queues.

16. The method of claim 11, further comprising:
storing the queues in a memory backend that includes a cache memory shared by the execution units.

17. The method of claim 11, wherein dispatching by the task frontend further comprises:
receiving, by the task frontend, a doorbell signal when a task is written to one of the queues; and
receiving, by the task frontend, a completion signal when one of the execution units reads the task and completes execution of the task.

18. The method of claim 11, wherein each queue is associated with a read index and a write index, and wherein the write index is stored in a memory-mapped I/O (MMIO) register to indicate a write location in the queue.

19. The method of claim 11, further comprising:
fetching, by the task frontend, a task from the queues;
storing the task in an internal buffer memory of the task frontend; and
dispatching the task to the execution units for execution.

20. The method of claim 11, wherein the tasks are represented by one or more task data structures pointing to program code of the tasks.

* * * * *